(12) United States Patent  (10) Patent No.: US 7,546,027 B2
Moriya (45) Date of Patent: Jun. 9, 2009

(54) IMAGE STABILIZER (75) Inventor: Chikatsu Moriya, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 526 days.

(21) Appl. No.: 11/392,905

(22) Filed: Mar. 30, 2006

(65) Prior Publication Data

US 2006/0222353 A1 Oct. 5, 2006

(30) Foreign Application Priority Data

Apr. 1, 2005 (JP) ............... 2005-106638

(51) Int. Cl.
G03B 17/00 (2006.01)
H04N 5/228 (2006.01)
(52) U.S. Cl. ................... 396/55; 348/208.99
(58) Field of Classification Search .......... 396/52, 396/55; 348/208.99, 208.1, 208.2, 208.3, 348/208.4, 208.16
See application file for complete search history.

(56) References Cited

U.S. PATENT DOCUMENTS 6,343,188 B1 * 1/2002 Morofuji ............... 396/55
2004/0085464 A1 5/2004 Higurashi et al.

2004/0189815 A1 9/2004 Kumaki

FOREIGN PATENT DOCUMENTS

| EP | 1 102 107 A2 | 5/2001 |
| EP | 1 102 107 A3 | 10/2001 |
| EP | 1 596 583 A | 11/2005 |
| JP | 2001-142103 A | 5/2001 |
| JP | 2002-229089 A | 8/2002 |
| JP | 2002 311471 A | 10/2002 |
| JP | 2003-107554 A | 4/2003 |

* cited by examiner

*Primary Examiner*—Rodney E Fuller
(74) *Attorney, Agent, or Firm*—Birch, Stewart, Kolasch & Birch, LLP (57) ABSTRACT

An image blur correction apparatus that includes a blur detection device, which detects a vibration applied to an optical system and outputs a blur signal in accordance with the detected vibration. Image blur correction is performed to cancel out an image blur that is produced by a vibration applied to the optical system, based on a blur signal output from the blur detection device. A determining device determines whether or not the size of a correction amount, indicating a size of an image blur correction according to the image blur correcting device, exceeds a predetermined threshold value. When the determining device determines that the a size of a correction amount exceeds a predetermined threshold value, the determination device switches from a mode of image blur correction to a mode of a pan/tilt operation.

12 Claims, 8 Drawing Sheets

IMAGE STABILIZER

BACKGROUND OF THE INVENTION

1. Field of the Invention

The present invention relates to an image blur correction apparatus, and more particularly to an image blur correction apparatus that corrects (prevents) image blurs caused by vibration of a camera or the like.

2. Description of the Related Art

A device is known which is configured to correct image blurs as an image blur correction apparatus for a television camera. In this device a vibration proof lens is disposed in an imaging optical system in a condition whereby it can move freely in a plane perpendicular to the optical axis. When a vibration is applied to the camera (camera's imaging optical system) the vibration proof lens is driven by an actuator so as to cancel out an image blur produced by that vibration (for example, see Japanese Patent Application Laid-Open Nos. 2001-142103 and 2003-107554). Other methods are also known which correct an image blur in addition to the above method using a vibration proof lens that moves in a plane perpendicular to the optical axis. A correction amount (corresponding to a displacement amount of the vibration proof lens when using a vibration proof lens) for canceling out an image blur with respect to a vibration applied to a camera can be determined, for example, by detecting the vibration applied to the camera using a blur detection sensor such as an angular velocity sensor, and calculating the correction amount based on the blur signal output from the blur detection sensor.

A camera (optical system) has already being proposed that refers to a blur signal obtained from a blur detection sensor to automatically determine whether or not an intentional operation (pan/tilt operation) is being performed to change the imaging composition that is not a vibration, such as a panning operation or tilting operation, and when the camera determines that a pan/tilt operation is underway it switches the image blur correction mode to a mode suited to performing a pan/tilt operation. For example, a camera has been proposed which, upon determining that a pan/tilt operation is underway, halts image blur correction (or reduces the effect of image blur correction) in order to eliminate poor operability with respect to a pan/tilt operation or unnaturalness of an image caused by image blur correction being performed at the time of the pan/tilt operation (for example, see Japanese Patent Application Laid-Open No. 2002-229089). A determination (pan/tilt determination) as to whether or not a camera is performing a pan/tilt operation is, for example, made by detecting whether or not the size of a blur signal from a blur detection sensor continuously exceeded a predetermined threshold value for a given time or more.

SUMMARY OF THE INVENTION

In image blur correction for an optical system in which the focal distance is variable, since the size of an image blur with respect to the same vibration differs according to the focal distance, the correction amount also changes in accordance with the focal distance. Generally, since the size of an image blur with respect to the same vibration is smaller on the wide edge where the focal distance is short than on the tele edge where the focal distance is long, the correction amount is also smaller. Thus, when a camera determines that a pan/tilt operation is being performed upon detecting that the size of a blur signal continuously exceeded a predetermined threshold value for a given time or more as described above, the correction range that is effectively used within the correctable range (range of movement of the vibration proof lens) changes according to the focal distance. However, when the correction range changes according to the focal distance in this manner, there is a problem that an incompatibility is produced whereby the effect of vibration reduction (effectiveness of image blur correction) also changes according to the focal distance.

The present invention was made in view of the above circumstances, and an object of the present invention is to provide an image blur correction apparatus that can make a pan/tilt determination such that the effectiveness of image blur correction is constant, regardless of the focal distance of the optical system.

In order to achieve the above object, an image blur correction apparatus according to a first aspect of the present invention comprises: a blur detection device which detects a vibration applied to an optical system and outputs a blur signal in accordance with the detected vibration; an image blur correcting device which performs image blur correction to cancel out an image blur that is produced by a vibration applied to the optical system based on a blur signal output from the blur detection device; a determining device which takes a fact that a size of a correction amount indicating a size of an image blur correction according to the image blur correcting device at least exceeds a predetermined threshold value as a determining condition for determining that a pan/tilt operation is being performed, and determines whether or not the determining condition is fulfilled; and a correction switching device which, when the determining device determines that the determining condition is fulfilled, switches a mode of image blur correction performed by the image blur correcting device to a mode for a time of a pan/tilt operation.

According to the present invention, since a determination as to whether or not a pan/tilt operation is being performed is made on the basis of the size of a correction amount that indicates the size of an image blur correction for canceling out an image blur, and not on the basis of a blur signal from a blur detection device, a pan/tilt determination can be made such that the manner of the image blur correction remains constant, regardless of the focal distance of the optical system.

An image blur correction apparatus according to a second aspect is in accordance with the first aspect, wherein the determining device takes a fact that the correction amount continuously exceeds a predetermined threshold value for a predetermined determining time or more as a determining condition for determining that a pan/tilt operation is being performed. In addition to a condition that a correction amount exceeds a predetermined threshold value, the present invention also takes a fact that that state continues for a predetermined determining time or more as a condition to determine that a pan/tilt operation is being performed.

An image blur correction apparatus according to a third aspect comprises: a blur detection device which detects a vibration applied to an optical system and outputs a blur signal in accordance with the detected vibration; a determining device which takes a fact that a blur signal output from the blur detection device is at least saturated as a determining condition for determining that a pan/tilt operation is being performed, and determines whether or not the determining condition is fulfilled; an image blur correcting device which performs image blur correction to cancel out an image blur that is produced by a vibration applied to the optical system, based on a blur signal output from the blur detection device; and a correction switching device which, when the determining device determines that the determining condition is fulfilled, switches a mode of image blur correction performed by the image blur correcting device to a mode for a time of a pan/tilt operation. According to the present invention, since a determination that a pan/tilt operation is being performed is made when a blur signal that is output from a blur detection device is saturated and image blur correction can not be suitably performed, it is possible to perform image blur correction utilizing the correctable range as much as possible.

An image blur correction apparatus according to a fourth aspect is in accordance with the third aspect, wherein the determining device takes a fact that the blur signal is continuously in a saturated state for a predetermined determining time or more as a determining condition for determining that a pan/tilt operation is being performed. In addition to a condition that a blur signal is saturated, the present invention also takes a fact that the state continues for a predetermined time or more as a condition to determine whether or not a pan/tilt operation is being performed.

An image blur correction apparatus according to a fifth aspect is in accordance with the first or second aspect, wherein when any condition among the determining conditions and the determining condition according to the third or fourth aspect is fulfilled, the correction switching device switches a mode of image blur correction by the image blur correcting device to a mode for a time of a pan/tilt operation. The present invention determines that a pan/tilt operation is being performed when any one of the determining conditions according to the first to fourth aspects is fulfilled.

According to the image blur correction apparatus of the present invention, a pan/tilt determination can be made such that the effectiveness of image blur correction is constant, irrespective of the focal distance of the optical system.

DETAILED DESCRIPTION OF THE PREFERRED EMBODIMENTS

Hereunder, preferred embodiments of the image blur correction apparatus of the present invention are described in detail in accordance with the attached drawings.

Figure 1:
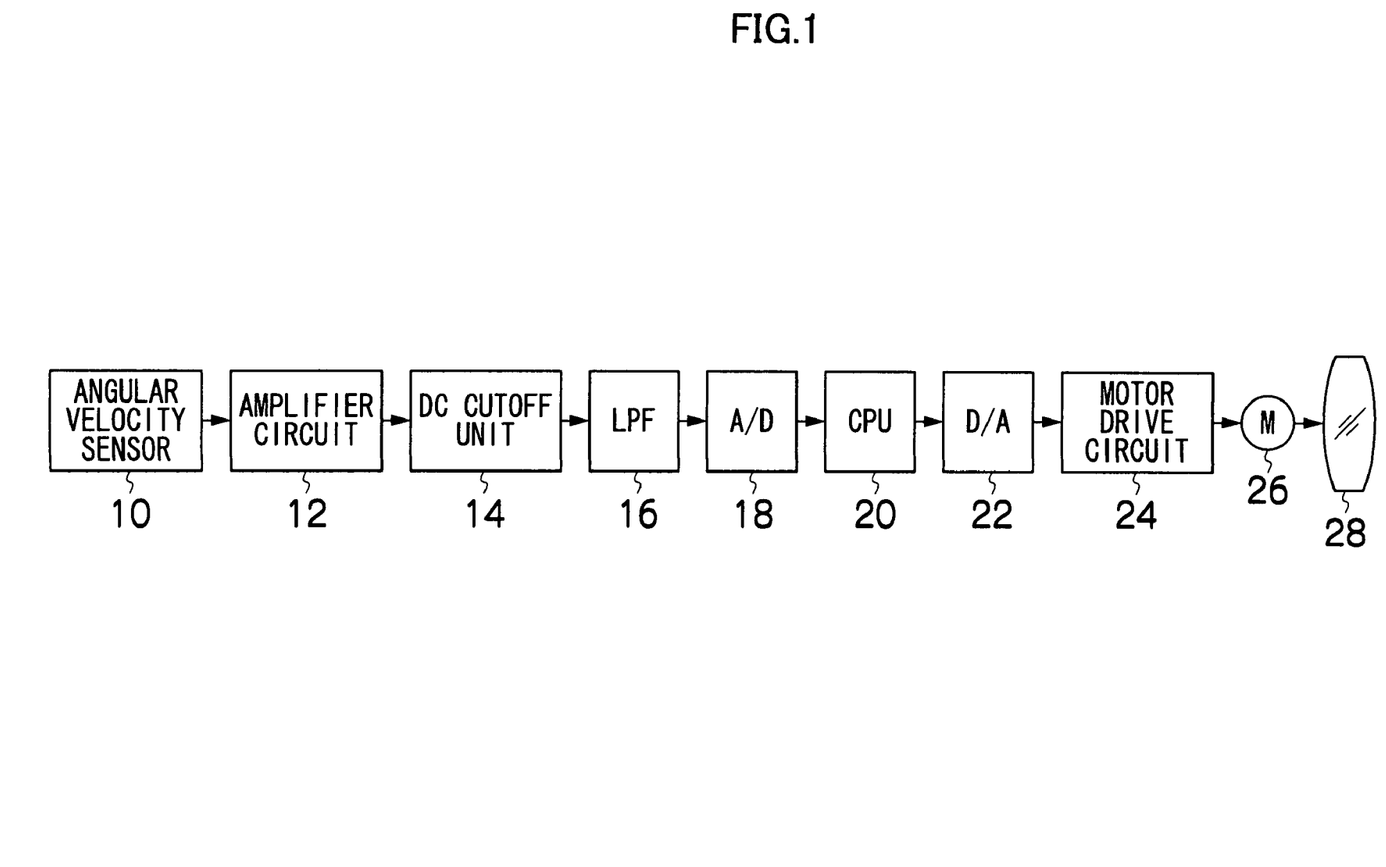
FIG. 1 is a configuration diagram which shows the configuration of an image blur correction apparatus of the present invention.

FIG. 1 is a configuration diagram which shows the configuration of an image blur correction apparatus of the present invention. The image blur correction apparatus is, for example, mounted on a lens apparatus for a television camera (imaging lens), a movie camera, a still camera or the like. A vibration proof lens 28 shown in FIG. 1 is provided in an optical system such as a lens apparatus or a camera on which the present apparatus is mounted, and is disposed in a condition such that it can move in a left to right direction (horizontal direction) and up and down direction (vertical (perpendicular) direction) in a plane perpendicular to the optical axis of the optical system. The vibration proof lens 28 is driven in a horizontal direction or vertical direction by a motor 26. When a vibration occurs in the camera (optical system), the vibration proof lens 28 is moved by the motor 26 to a position for correcting an image blur (position that cancels out an image blur produced by the vibration). In this connection, since the vibration proof lens 28 is driven in a similar manner in both the horizontal direction and vertical direction for vibrations occurring in each direction, FIG. 1 illustrates only a configuration that performs an image blur correction for one direction (for example, the horizontal direction), and it is assumed that a similar configuration is provided for the other direction.

In FIG. 1, an angular velocity sensor 10 is a gyro sensor that is provided as a blur detection sensor for detecting a vibration of the optical system, and it is disposed on the top surface or the like of a lens cone. An electrical signal of a voltage in accordance with the angular velocity of a vibration of the optical system that occurred, for example, in the horizontal direction, is output from the angular velocity sensor 10 as an angular velocity signal.

An angular velocity signal that was output from the angular velocity sensor 10 is subjected to amplification processing by an amplifier circuit 12. Thereafter, mainly direct-current components (low frequency components under a predetermined cutoff frequency) are blocked by a DC cutoff unit (high pass filter (HPF)) 14 and the other frequency components pass through the DC cutoff unit 14. An angular velocity signal that passed through the DC cutoff unit 14 is next input into a low pass filter (LPF) 16. At the LPF 16, high frequency components that are not an object of image blur correction among the frequency components of the angular velocity signal are blocked, and other frequency components pass through the LPF 16. The angular velocity signal that passed through the LPF 16 is converted to a digital signal by an A/D converter 18, and then input to a CPU 20.

The CPU 20 converts the angular velocity signal into an angle signal (position signal) by subjecting the angular velocity signal that was input as described above to integration processing by a processing operation of a digital filter, to thus determine a correction amount for correcting an image blur by subjecting that angle signal to amplification processing. In this example, the optical system on which the vibration proof lens 28 is disposed is a variable focal-distance optical system comprising a zoom function in which the focal distance can be varied. The size of an image blur produced by a vibration that occurred in the optical system differs in accordance with the focal distance of the optical system. Therefore, a displacement amount (correction amount for canceling out an image blur to correct the image blur) from a reference position of the vibration proof lens 28 for canceling out an image blur will also differ according to the focal distance. Thus, the CPU 20 acquires information regarding the focal distance that is currently set from the lens apparatus or camera or the like on which the present apparatus is mounted. The CPU 20 then performs amplification processing for the value of the above angle signal with a gain value in accordance with the focal distance, based on the acquired focal distance information. The CPU 20 thereby determines a correction amount for correcting an image blur by canceling out an image blur produced by a vibration in the optical system. The CPU 20 outputs the correction amount that was sequentially determined in this manner to a D/A converter 22 as a control signal which indicates a movement target position of the vibration proof lens 28.

A control signal output from the CPU 20 to the D/A converter 22 is converted into an analog signal by the D/A converter 22, and then input to a motor drive circuit 24. The motor drive circuit 24 drives a motor 26 to drive the vibration proof lens 28 in, for example, a horizontal direction, to move the vibration proof lens 28 to a position corresponding to the value (correction amount) of the control signal output from the CPU 20. Thus, an image blur generated by a vibration applied to the optical system is corrected.

The image blur correction system may be a system other than the system described in this embodiment. The system of this embodiment uses an image displacement device which displaces the vibration proof lens 28 to intentionally displace the imaging position of an image that is imaged by the optical system in a horizontal direction or vertical direction within the imaging plane. Using this image displacement device, the system corrects image blurs by displacing an image so as to cancel out an image blur caused by a vibration that was applied to the optical system. An image displacement device that intentionally displaces an image in this manner need not necessarily be a device using a vibration proof lens as in the present embodiment and, for example, it may be an image displacement device that intentionally displaces an image by displacing an imaging range that effectively images an image for recording or playback by displacing an image pickup device of a camera, or an electronic image displacement device that intentionally displaces an image by displacing a range for cutting out an image signal for recording or playback from within a range of captured images that are imaged by an image pickup device of a camera. In image blur correction according to these kinds of different systems, by subjecting an angular velocity signal obtained from the angular velocity sensor 10 to amplification processing with a gain value that is in accordance with a focal distance or integration processing, similarly to the present embodiment it is possible to determine a correction amount in order to displace an image with the image displacement device by a displacement amount necessary for canceling out the image blur.

In addition to calculating a correction amount as described above, the CPU 20 also performs a pan/tilt determination. A pan/tilt determination is a determination as to whether or not an image-composition changing operation such as a panning operation or tilting operation is being performed as the result of an intentional operation by the cameraman to change the image composition, and not as the result of a vibration of the optical system (camera). The processing contents of a pan/tilt determination are described later. When the CPU 20 determined by a pan/tilt determination that a pan/tilt operation is being performed, it executes processing to halt the above described image blur correction. For example, the CPU 20 increases the cutoff frequency of the DC cutoff unit (HPF) 14 to substantially block an angular velocity signal. As a result, by continuing to calculate the correction amount, the correction amount gradually decreases to 0, and by driving the vibration proof lens 28 based on the correction amount, the vibration proof lens 28 moves to the reference position and stops. By halting image blur correction in this manner when a pan/tilt operation is being performed, it is possible to prevent problems caused by image blur correction being performed during a pan/tilt operation.

When the angular velocity sensor 10 is taken as a sensor which detects a vibration in a horizontal direction, a pan determination is made regarding whether or not a pan/tilt operation is being performed in the horizontal direction, that is, whether or not a panning operation is being performed, based on an angular velocity signal that is acquired from the angular velocity sensor 10. When the CPU determines that a panning operation is being performed, image blur correction with respect to the horizontal direction is halted. In contrast, when the angular velocity sensor 10 as shown in FIG. 1 is taken as a sensor which detects a vibration in a vertical direction, a tilt determination is made regarding whether or not a pan/tilt operation is being performed in the vertical direction, that is, whether or not a tilting operation is being performed, based on an angular velocity signal that is acquired from the angular velocity sensor 10. When the CPU determines that a tilting operation is being performed, image blur correction with respect to the vertical direction is halted.

A configuration may also be employed whereby, when the CPU determined, as described above, that a pan/tilt operation is being performed, the effect of image blur correction is reduced without completely halting image blur correction.

Further, when image blur correction was halted upon deciding that a pan/tilt operation is being performed, the image blur correction automatically restarts when the CPU determines that the pan/tilt operation has ended upon a predetermined condition being fulfilled. Although a detailed description regarding a determination as to whether or not a pan/tilt operation ended is omitted here, for example, it may be determined that a pan/tilt operation ended when the value of an angular velocity signal is continuously less than a predetermined threshold value for a given time or more.

Figure 2:
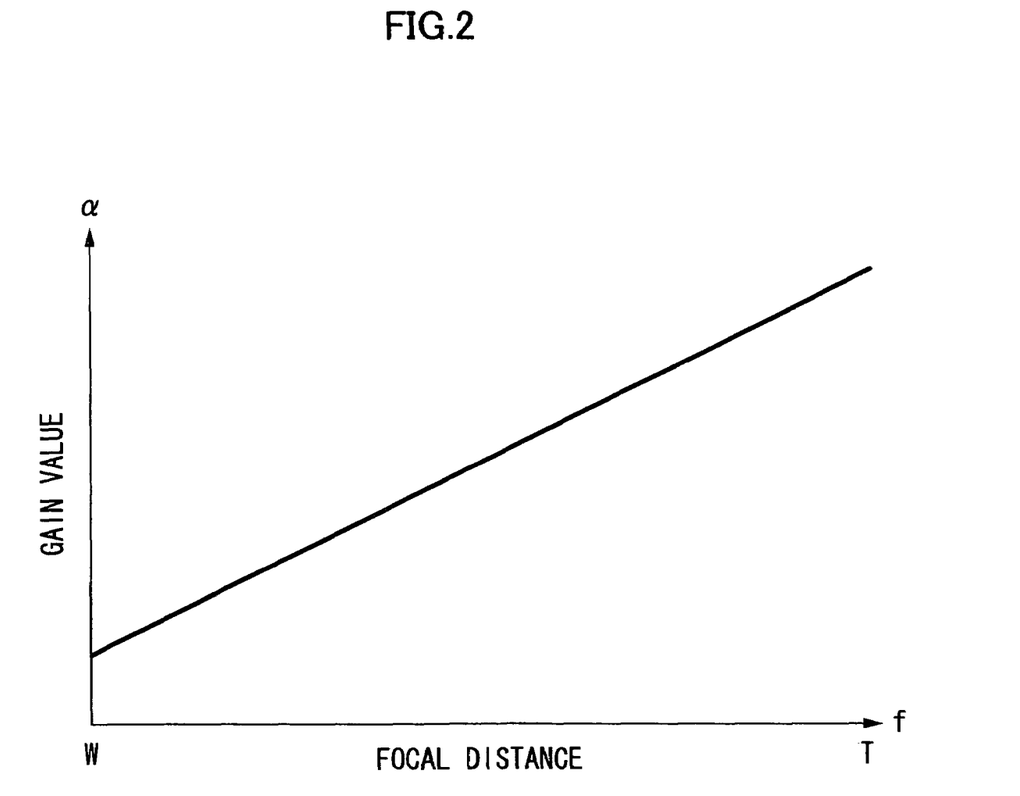
FIG. 2 is a view for exemplifying a gain value in accordance with a focal distance when calculating a correction amount.
Figure 3:
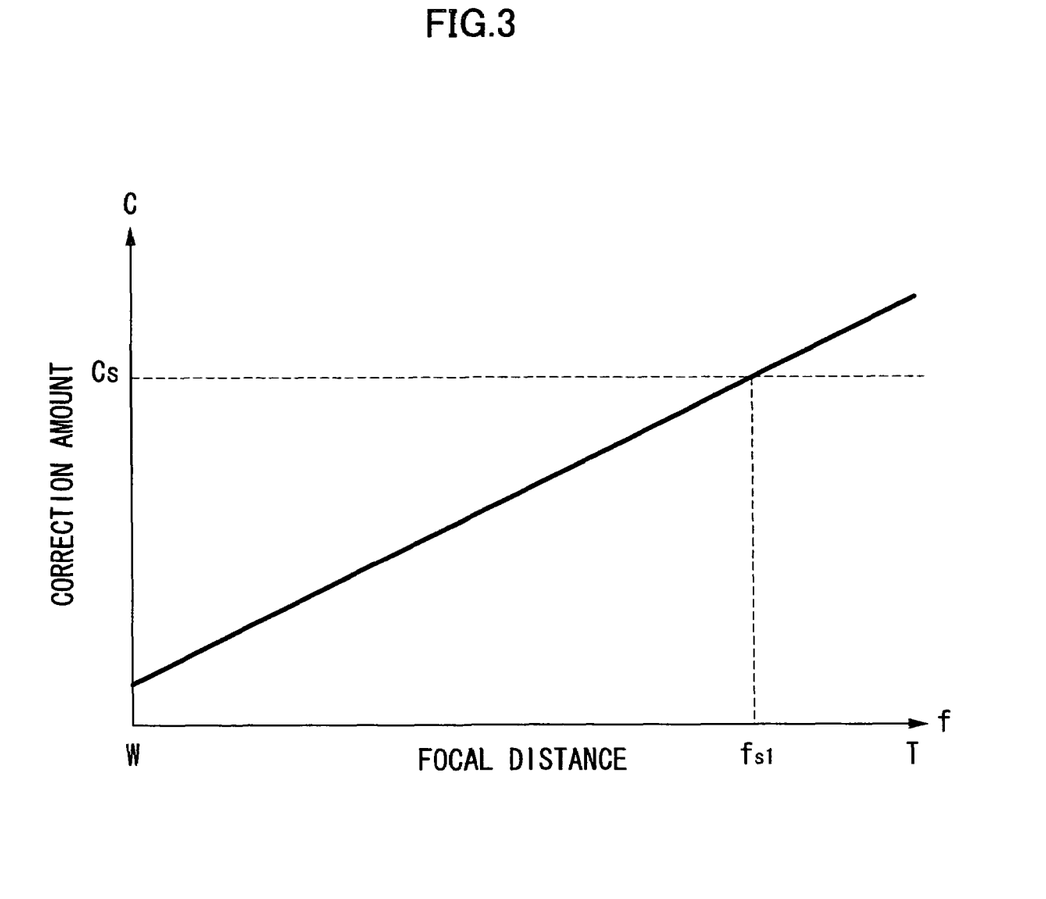
FIG. 3 is a view for exemplifying a gain value in accordance with a focal distance.

Next, a first embodiment of the pan/tilt determination will be described. As described above, the CPU 20 determines an angle signal (position signal) by subjecting an angular velocity signal acquired from the angular velocity sensor 10 to integration processing, and performs amplification processing for that angle signal by multiplying it by a gain value $\alpha$ in accordance with the focal distance of the optical system to determine a correction amount (corresponding to a displacement amount of the vibration proof lens 28 for canceling out an image blur) for image blur correction. FIG. 2 is a view for simply illustrating the size of a gain value $\alpha$ (vertical axis) in accordance with a focal distance f (horizontal axis) of an optical system. As shown in the FIG. 2, the gain value $\alpha$ increases as the focal distance f lengthens, that is, as it approaches the tele-end, and decreases as the focal distance f shortens, that is, as it approaches the wide-end. FIG. 3 is a view that exemplifies a correction amount (correction amount size) C determined at a given time in accordance with changes in the focal distance f. As shown in the figure, reflecting the relation between the focal distance f and gain value $\alpha$ shown in FIG. 2, as the focal distance f lengthens the correction amount C increases, and as the focal distance f shortens the correction amount C decreases.

According to the first embodiment of a pan/tilt determination, when the size (absolute value) of the correction amount exceeds a predetermined threshold value (hereunder, referred to as "pan/tilt determination threshold value") the CPU determines that a pan/tilt operation is being performed, and when the size of the correction amount does not exceed the threshold value the CPU does not determine that a pan/tilt operation is being performed. In FIG. 3, the pan/tilt determination threshold value is represented by Cs. The threshold value Cs is set as a constant value independently of the focal distance. As a preferable value, the threshold value Cs is set to a value that is close to a maximum value $C_{MAX}$ of the correctable range (for example, a value that is 97 percent of the maximum value $C_{MAX}$). In this connection, the maximum value $C_{MAX}$ of the correctable range is a value corresponding to the end position of the range of movement of the vibration proof lens 28, and the threshold value Cs may be set as a value that matches the maximum value $C_{MAX}$, or may be set to an arbitrary value that is not close to the maximum value $C_{MAX}$.

According to the example in the same figure, when the focal distance f is longer than a focal distance $f_{S1}$, the correction amount C exceeds the threshold value Cs. Accordingly, when the focal distance f is longer than $fs_1$, the CPU determines that a pan/tilt operation is being performed, and when the focal distance f is shorter than $fs_1$, it determines that a pan/tilt operation is not being performed. FIG. 3 illustrates one example of the relation between the focal distance and the correction amount, and the size of the correction amount will vary according to the state of a vibration applied to the optical system, and the focal distance $f_{S1}$ when the size of the correction amount exceeds the threshold value Cs will also vary on the wide edge or tele edge with respect to the position indicated in FIG. 3.

Figure 4:
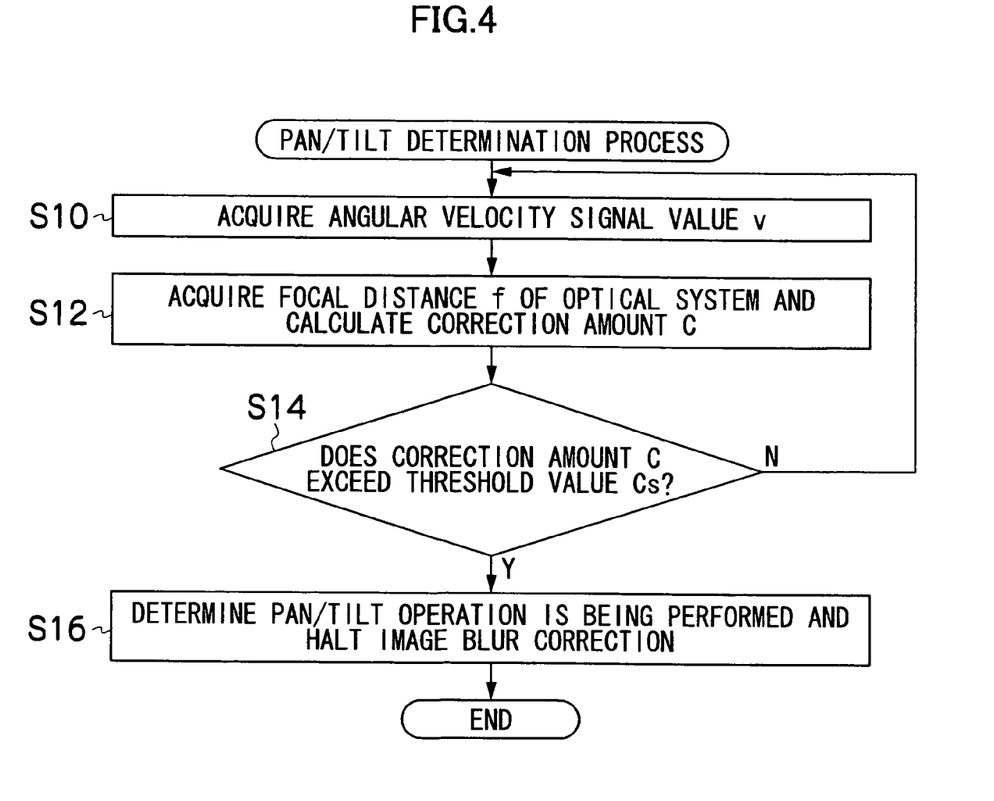
FIG. 4 is a flowchart for illustrating the processing procedures of a first embodiment of a pan/tilt determination at the CPU.

FIG. 4 is a flowchart for illustrating the processing procedures of the first embodiment of a pan/tilt determination by the CPU 20. This flowchart illustrates the processing procedures of the above described pan/tilt determination by the CPU 20. The CPU 20 first acquires a value v of an angular velocity signal from the angular velocity sensor 10 (step S10). Next, it acquires information regarding a focal distance f that is currently set for the optical system together with a gain value α corresponding to the focal distance f, to thereby determine a correction amount C using the acquired value v of the angular velocity signal (step S12). The CPU 20 then determines whether or not the determined correction amount C exceeds the threshold value Cs (step S14). When the determination result at step S14 is NO, the operation returns to step S110, to repeat the process from step S110.

In contrast, when the determination result at the above step S14 is YES, i.e. when the CPU 20 determined that the correction amount C exceeds the threshold value Cs, it determines that a pan/tilt operation is being performed and carries out processing to halt image blur correction (step S16). The present process then ends.

According to the above described process, when the correction amount C exceeds a predetermined threshold value Cs, the CPU 20 determines that a pan/tilt operation is being performed.

Figure 5:
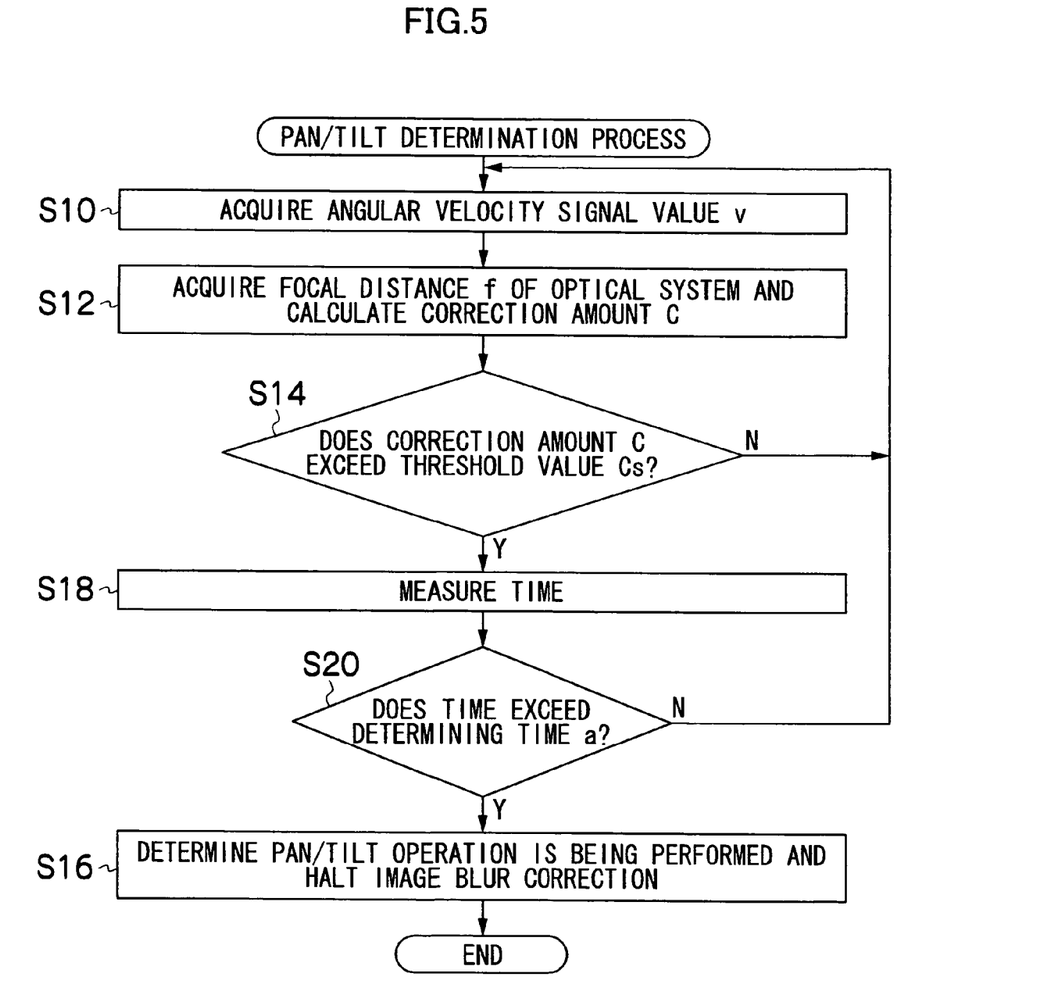
FIG. 5 is a flowchart for illustrating the processing procedures of a second embodiment of a pan/tilt determination at the CPU.

Next, a second embodiment of the pan/tilt determination will be described. Although in the first embodiment, the CPU determined that a pan/tilt operation was being performed when the correction amount C exceeded a predetermined threshold value Cs, in the second embodiment the CPU determines that a pan/tilt operation is being performed when the correction amount C exceeds a predetermined threshold value Cs and that state continues for a predetermined determining time. FIG. 5 is a flowchart for illustrating the processing procedures of the second embodiment of a pan/tilt determination by the CPU 20. In FIG. 5, process steps that are the same as steps in FIG. 4 are denoted by the same step numbers. First, the CPU 20 acquires a value v of an angular velocity signal from the angular velocity sensor 10 (step S1). Next, it acquires information regarding a focal distance f that is currently set for the optical system together with a gain value α corresponding to the focal distance f, to thereby determine a correction amount C using the acquired value v of the angular velocity signal (step S12). The CPU 20 then determines whether or not the determined correction amount C exceeds the threshold value Cs (step S14). When the determination result at step S14 is NO, the operation returns to step S10, to repeat the process from step S10.

In contrast, when the determination result at the above step S14 is YES, i.e. when the CPU 20 determined that the correction amount C exceeds the maximum value Cs, it measures the time up to the current time for which the determination result was continuously YES in step S14 (step S18). Next, it determines whether or not the time measured according to step S18 exceeds a predetermined determining time a (step S20). When the determination result at step S20 is NO, the operation returns to step S10, to repeat the process from step S10.

In contrast, when the determination result at step S20 is YES, the CPU 20 determines that a pan/tilt operation is being performed and carries out processing to halt image blur correction (step S16). The present process then ends.

According to the above described process, when the correction amount C continuously exceeds a threshold value Cs for a determining time a or more, the CPU 20 determines that a pan/tilt operation is being performed.

Next, a third embodiment of the pan/tilt determination will be described. For a pan/tilt determination as described in the first and second embodiments, the shorter the focal distance of the optical system the less likely it is that the CPU 20 will determine that a pan/tilt operation is being performed, even if the vibration state is the same. Therefore, particularly in the case of the wide edge for which the focal distance is short, there are cases in which an angular velocity signal obtained from the angular velocity sensor 10 is saturated before the correction amount C exceeds the threshold value Cs. It can be considered that image blur correction can not be suitably performed in a state in which the angular velocity signal is saturated and that, furthermore, a pan/tilt operation is being performed when the angular velocity signal is saturated.

Thus, according to the third embodiment, when the CPU 20 detects that the angular velocity signal is saturated, it determines that a pan/tilt operation is being performed even when the correction amount C does not exceed the maximum value Cs.

Figure 6:
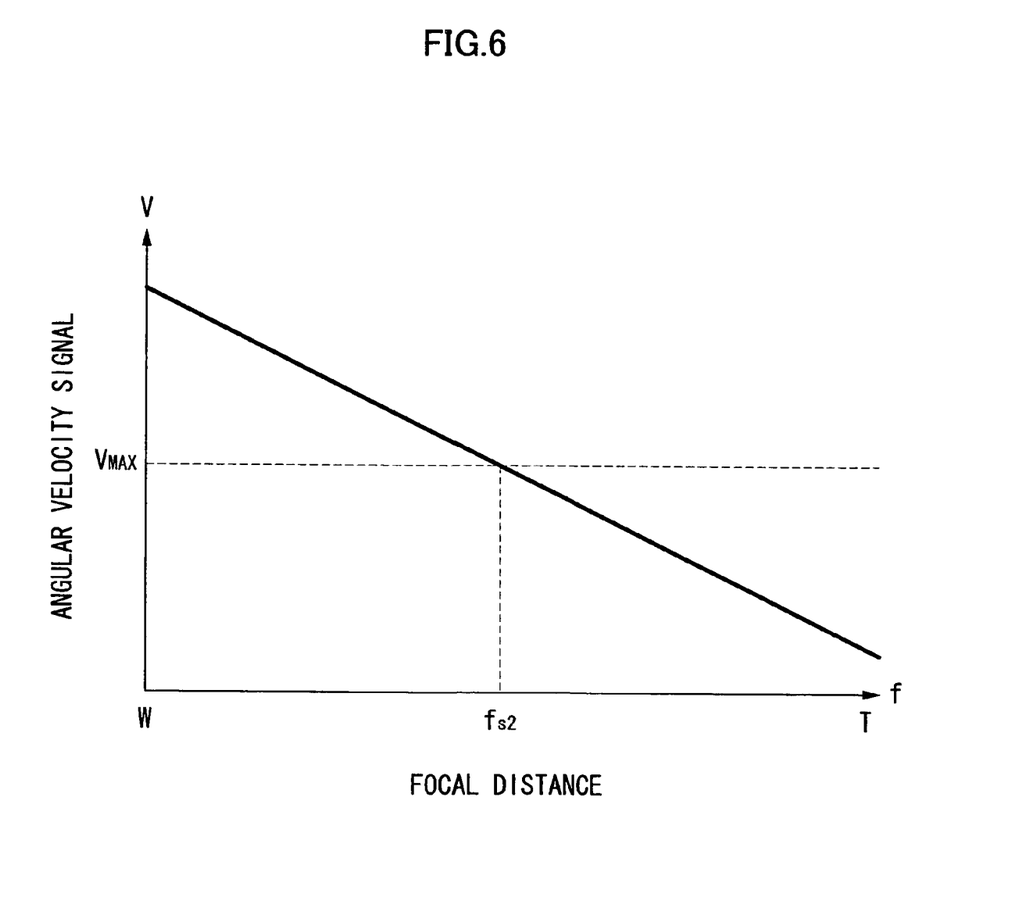
FIG. 6 is a view for exemplifying a vibration value of an angular velocity signal in accordance with changes in a focal distance when a correction amount saturates.

FIG. 6 is a view that, when it is assumed that an angular velocity signal of a constant frequency is output from the angular velocity sensor 10, illustrates changes in a vibration value V of the angular velocity signal when the correction amount C that is determined based on that angular velocity signal equals the above described threshold value Cs, in accordance with the focal distance f of the optical system. As shown in FIG. 6, as the focal distance f lengthens the vibration value V of the angular velocity signal when the correction amount C equals the threshold value Cs decreases, and as the focal distance f shortens the vibration value V of the angular velocity signal when the correction amount C equals the threshold value Cs increases. Meanwhile, when a value $V_{MAX}$ at which the angular velocity signal saturates is shown in the same figure, at the wide edge on which the focal distance f is shorter than $fs_2$ in the example in FIG. 6, even when the correction amount C does not reach the threshold value Cs the angular velocity signal saturates. Thus, according to this embodiment, when the focal distance f is shorter than $fs_2$, the CPU 20 determines that a pan/tilt operation is being performed when the angular velocity signal is saturated.

Figure 7:
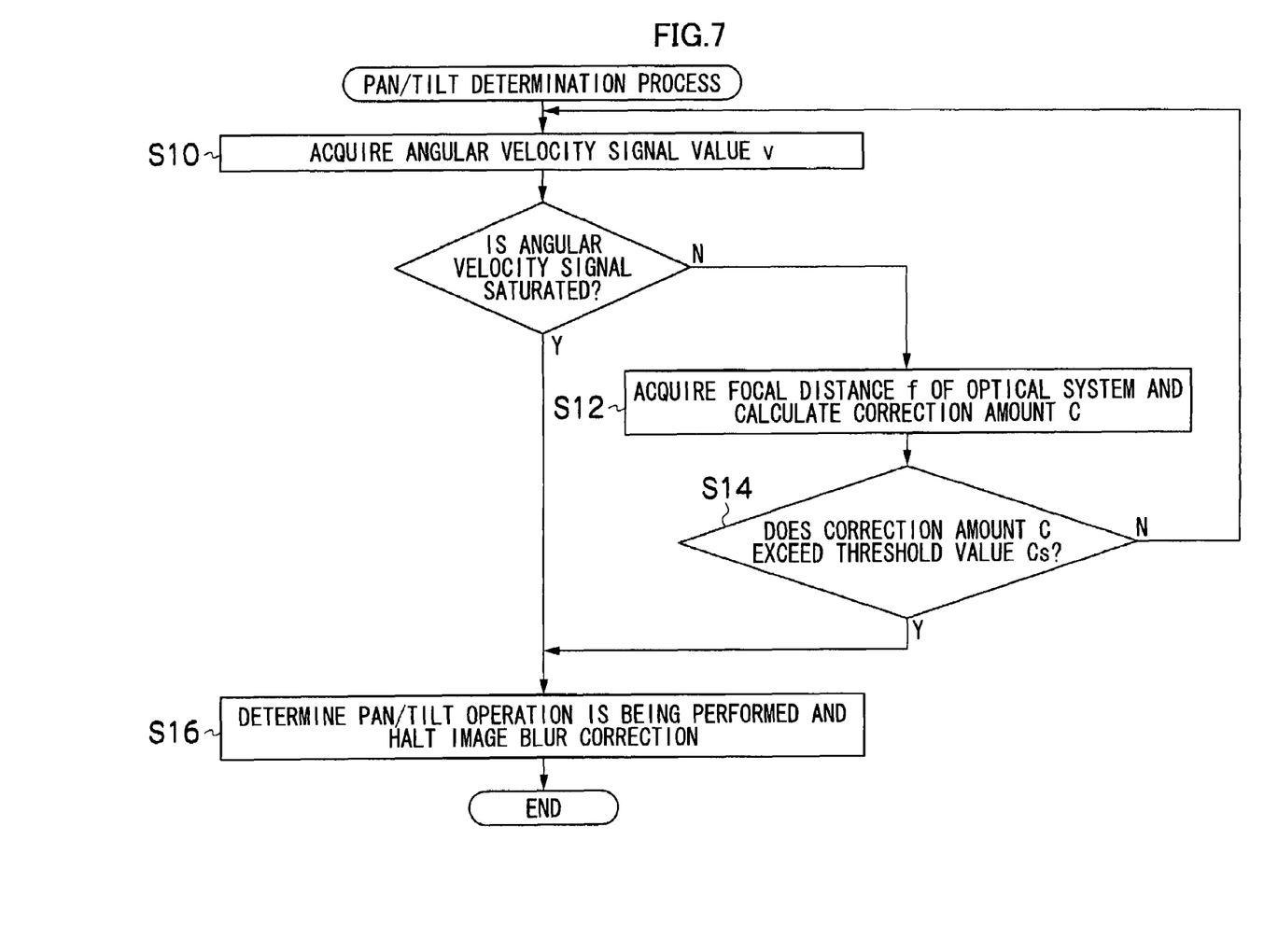
FIG. 7 is a flowchart for illustrating the processing procedures of a third embodiment of a pan/tilt determination at the CPU.

FIG. 7 is a flowchart for illustrating the processing procedures of the third embodiment of a pan/tilt determination by the CPU 20. In FIG. 7, process steps that are the same as steps in the flowchart of FIG. 4 are denoted by the same step numbers. First, the CPU 20 acquires a value v of an angular velocity signal from the angular velocity sensor 10 (step S10). Next it determines whether or not the angular velocity signal is saturated based on the acquired value v of the angular velocity signal. More specifically, it determines whether or not the acquired value v of the angular velocity signal reached the value $V_{MAX}$ at which the angular velocity signal is saturated (step S30). When the determination result is NO, the CPU 20 acquires information regarding a focal distance f that is currently set for the optical system together with a gain value α corresponding to the focal distance f, to thereby determine a correction amount C using the acquired value v of the angular velocity signal (step S12). The CPU 20 then determines whether or not the determined correction amount C exceeds the threshold value Cs (step S14). When the determination result at step S14 is NO, the operation returns to step S10, to repeat the process from step S10.

In contrast, when the determination result at the above step S14 is YES, that is, when the CPU 20 determines that the correction amount C exceeds the threshold value Cs, it determines that a pan/tilt operation is being performed and carries out processing to halt image blur correction (step S16). The present process then ends.

When the determination result at the above step S30 is YES, that is, when the CPU 20 determines that the angular velocity signal is saturated, it determines that a pan/tilt operation is being performed and carries out processing to halt image blur correction (step S16). The present process then ends.

According to the above processing, when either of the two above determining conditions, i.e. 1) the angular velocity signal is saturated, or 2) the correction amount C exceeds the threshold value Cs, is fulfilled, the CPU 20 determines that a pan/tilt operation is being performed.

In this connection, a configuration may also be adopted whereby the processing of steps S12, S14, S18 and S20 of FIG. 5 in the second embodiment is performed in place of the processing of steps S12 and S14 of FIG. 7, such that the CPU 20 determines that a pan/tilt operation is being performed when either one of the determining conditions that 1) the angular velocity signal is saturated, or 2) the correction amount C continuously exceeded the threshold value Cs for a determining time a or more, is fulfilled.

Figure 8:
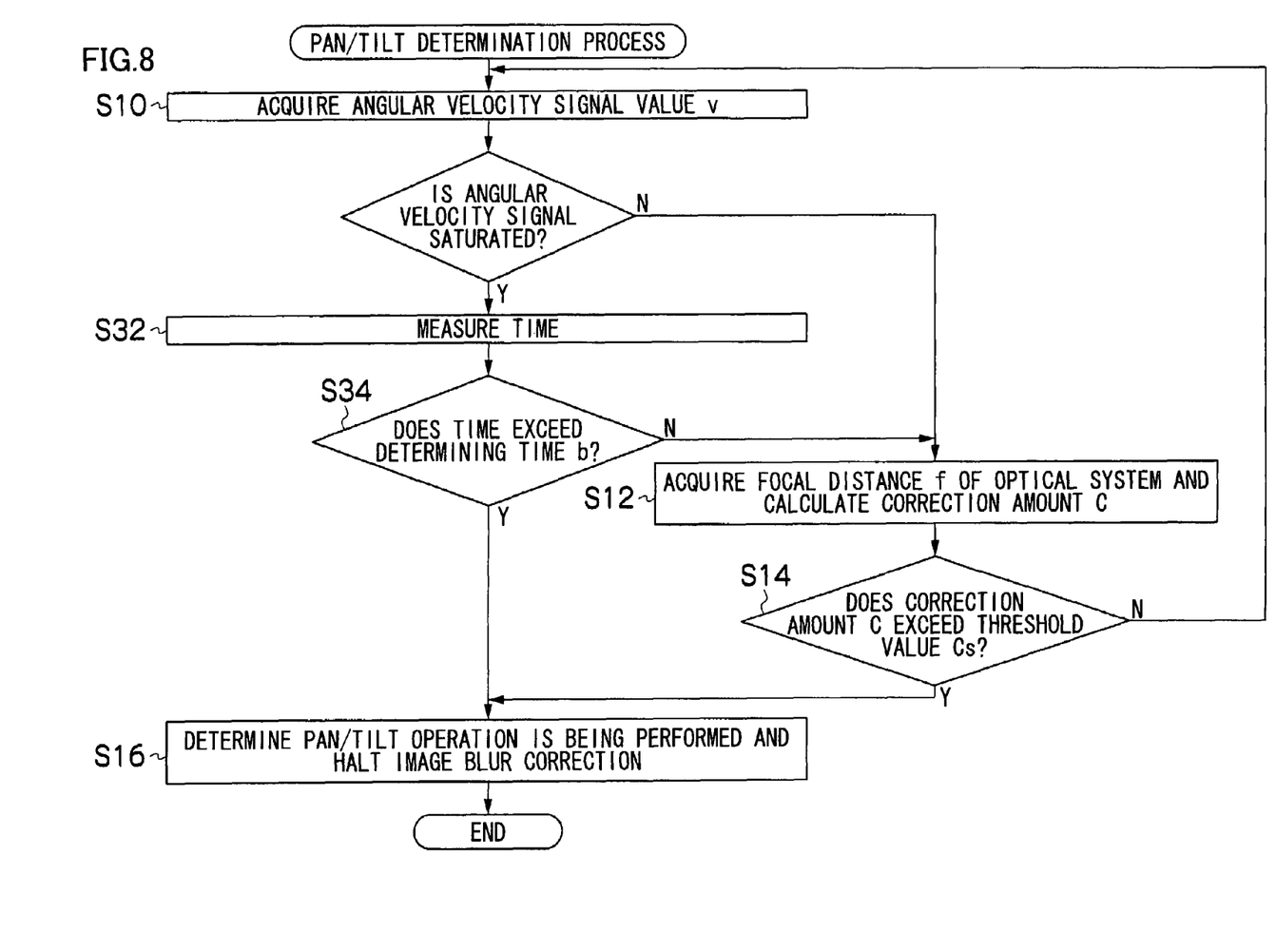
FIG. 8 is a flowchart for illustrating the processing procedures of a fourth embodiment of a pan/tilt determination at the CPU.

Next, a fourth embodiment of a pan/tilt determination is described. Although according to the third embodiment the CPU 20 determines that a pan/tilt operation is being performed when an angular velocity signal obtained from the angular velocity sensor 10 is saturated, according to the fourth embodiment the CPU 20 determines that a pan/tilt operation is being performed when the angular velocity signal is saturated and that state continued for a predetermined determining time b or more. FIG. 8 is a flowchart for illustrating the processing procedures of the fourth embodiment of a pan/tilt determination by the CPU 20. In FIG. 8, process steps that are the same as steps in the flowchart of FIG. 7 (and FIG. 4) are denoted by the same step numbers. First, the CPU 20 acquires a value v of an angular velocity signal from the angular velocity sensor 10 (step S10). Next, it determines whether or not the angular velocity signal is saturated based on the acquired value v of the angular velocity signal. More specifically, it determines whether or not the acquired value v of the angular velocity signal reached the value $V_{MAX}$ at which the angular velocity signal is saturated (step S30). When the determination result is NO, the CPU 20 acquires information regarding a focal distance f that is currently set for the optical system together with a gain value α corresponding to the focal distance f, to thereby determine a correction amount C using the acquired value v of the angular velocity signal (step S12). The CPU 20 then determines whether or not the determined correction amount C exceeds the threshold value Cs (step S14). When the determination result at step S14 is NO, the operation returns to step S10, to repeat the process from step S10.

In contrast, when the determination result at the above step S14 is YES, that is, when the CPU 20 determines that the correction amount C exceeds the threshold value Cs, it determines that a pan/tilt operation is being performed and carries out processing to halt image blur correction (step S16). The present process then ends.

When the determination result at the above step S30 is YES, i.e. when the CPU 20 determined that the angular velocity signal is saturated, it measures the time up to the current time for which the determination result was continuously YES at step S30 (step S32). Next, it determines whether or not the time measured according to step S32 exceeds a predetermined determining time b (step S34). When the determination result at step S34 is NO, the process moves to step S12.

In contrast, when the determination result at the above step S34 is YES, that is, when the CPU 20 determined that the angular velocity signal was continuously saturated for a predetermined determining time or more, the CPU 20 determines that a pan/tilt operation is being performed and carries out processing to halt image blur correction (step S16). The present process then ends.

According to the above described process, the CPU 20 determines that a pan/tilt operation is being performed when either one of the determining conditions that 1) the angular velocity signal is saturated continuously for a predetermined determining time b or more, or 2) the correction amount C exceeded the threshold value Cs, is fulfilled.

In this connection, a configuration may also be adopted whereby the processing of steps S12, S14, S18 and S20 of FIG. 5 in the second embodiment is performed in place of the processing of steps S12 and S14 of FIG. 8, such that the CPU 20 determines that a pan/tilt operation is being performed when either one of the determining conditions that 1) the angular velocity signal is saturated continuously for a predetermined determining time b or more, or 2) the correction amount C continuously exceeded the threshold value Cs for a determining time a or more, is fulfilled.

In the above described first to fourth embodiments, although a configuration was adopted whereby the CPU 20 determines that a pan/tilt operation is being performed when the size of a correction amount C that is calculated on the basis of an angular velocity signal at least exceeds a predetermined threshold value Cs, a configuration may also be adopted whereby a pan/tilt determination is made in the same manner as in the above embodiments by employing a position (displacement amount) of the vibration proof lens 28 that was actually detected by a position sensor as the correction amount C, instead of the correction amount C that is calculated on the basis of an angular velocity signal. Further, even when employing an image blur correction system that is different to the present embodiments as described above, a pan/tilt determination can made in the same manner as in the above embodiments by detecting the displacement amount of an image that was actually displaced by an image displacement device which intentionally displaces an image to correct an image blur, and employing that displacement amount as the correction amount C.

Although in the above third and fourth embodiments it is assumed that the CPU determines that a pan/tilt operation is being performed when the correction amount C exceeded the threshold value Cs, a different condition may be taken as a premise for deciding that a pan/tilt operation is being performed, or simply the fact that the angular velocity signal is saturated or that the angular velocity signal is saturated continuously for a predetermined determining time or more may be taken as the determining condition for deciding that a pan/tilt operation is being performed, and the CPU may also determine that a pan/tilt operation is not being performed when that determining condition is not fulfilled.

Further, although in the above embodiments a description was given regarding a case of making a pan/tilt determination after detecting a vibration applied to an optical system using an angular velocity sensor and then calculating a correction amount based on an angular velocity signal output from the angular velocity sensor, the present invention can also be applied to a case in which a vibration applied to an optical system is detected by a blur detection device other than an angular velocity sensor, for example, an angular acceleration sensor, acceleration sensor, velocity sensor, angular displacement sensor or displacement sensor, and a correction amount calculation or pan/tilt determination is then made on the basis of a blur signal output from the blur detection device in correspondence with the vibration.

Furthermore, although in the above embodiments a description was given regarding a case in which image blur correction is halted or the effect of image blur correction is reduced as the mode of image blur correction when a pan/tilt operation is being performed, the image blur correction when a pan/tilt operation is being performed may be of a different mode thereto, and the present invention can also be applied to a case of switching between a mode for image blur correction when a pan/tilt operation is being performed and a mode for image blur correction when a pan/tilt operation is not being performed.

What is claimed is:

1. An image blur correction apparatus, comprising:
   a blur detection device which detects a vibration applied to an optical system and outputs a blur signal in accordance with the detected vibration;
   an image blur correcting device which performs image blur correction to cancel out an image blur that is produced by a vibration applied to the optical system, based on a blur signal output from the blur detection device;
   a determining device which determines whether or not a determining condition that a size of a correction amount indicating a size of an image blur correction according to the image blur correcting device at least exceeds a predetermined threshold value, is fulfilled; and
   a correction switching device which, when the determining device determines that the determining condition is fulfilled, switches a mode of image blur correction performed by the image blur correcting device to a mode of a pan/tilt operation.

2. The image blur correction apparatus according to claim 1,
   wherein the determining device takes a fact that the correction amount continuously exceeds a predetermined threshold value for a predetermined determining time or more as a determining condition for determining that a pan/tilt operation is being performed.

3. The image blur correction apparatus according to claim 2,
   wherein the correction switching device switches a mode of image blur correction performed by the image blur correcting device to a mode for a time of a pan/tilt operation, when a conditions that a size of an image blur correction according to the image blur correcting device at least exceeds a predetermined threshold value and a blur signal output from a blur detection device is at least saturated are fulfilled.

4. The image blur correction apparatus according to claim 2,
   wherein the correction switching device switches a mode of image blur correction performed by the image blur correcting device to a mode for a time of a pan/tilt operation, when the conditions that a size of an image blur correction according to the image blur correcting device at least exceeds a predetermined threshold value and the blur signal is continuously in a saturated state for a predetermined determining time or more are fulfilled.

5. The image blur correction apparatus according to claim 2,
   wherein the correction switching device switches a mode of image blur correction performed by the image blur correcting device to a mode for a time of a pan/tilt operation, when the conditions that the correction amount continuously exceeds a predetermined threshold value for a predetermined determining time or more and a blur signal output from the blur detection device is at least saturated are fulfilled.

6. The image blur correction apparatus according to claim 2,
   wherein the correction switching device switches a mode of image blur correction performed by the image blur correcting device to a mode for a time of a pan/tilt operation, when the conditions that the correction amount continuously exceeds a predetermined threshold value for a predetermined determining time or more and the blur signal is continuously in a saturated state for a predetermined determining time or more are fulfilled.

7. The image blur correction apparatus according to claim 1,
   wherein the correction switching device switches a mode of image blur correction performed by the image blur correcting device to a mode for a time of a pan/tilt operation, when a conditions that a size of an image blur correction according to the image blur correcting device at least exceeds a predetermined threshold value and a blur signal output from a blur detection device is at least saturated are fulfilled.

8. The image blur correction apparatus according to claim 1,
   wherein the correction switching device switches a mode of image blur correction performed by the image blur correcting device to a mode for a time of a pan/tilt operation, when the conditions that a size of an image blur correction according to the image blur correcting device at least exceeds a predetermined threshold value and the blur signal is continuously in a saturated state for a predetermined determining time or more are fulfilled.

9. The image blur correction apparatus according to claim 1,
   wherein the correction switching device switches a mode of image blur correction performed by the image blur correcting device to a mode for a time of a pan/tilt operation, when the conditions that the correction amount continuously exceeds a predetermined threshold value for a predetermined determining time or more and a blur signal output from the blur detection device is at least saturated are fulfilled.

10. The image blur correction apparatus according to claim 1,
    wherein the correction switching device switches a mode of image blur correction performed by the image blur correcting device to a mode for a time of a pan/tilt operation, when the conditions that the correction amount continuously exceeds a predetermined threshold value for a predetermined determining time or more and the blur signal is continuously in a saturated state for a predetermined determining time or more are fulfilled.

11. An image blur correction apparatus, comprising:
a blur detection device which detects a vibration applied to an optical system and outputs a blur signal in accordance with the detected vibration;
a determining device which takes a fact that a blur signal output from the blur detection device is at least saturated as a determining condition for determining that a pan/tilt operation is being performed, and determines whether or not the determining condition is fulfilled;
an image blur correcting device which performs image blur correction to cancel out an image blur that is produced by a vibration applied to the optical system, based on a blur signal output from the blur detection device; and
a correction switching device which, when the determining device determines that the determining condition is fulfilled, switches a mode of image blur correction performed by the image blur correcting device to a mode for a time of a pan/tilt operation.

12. The image blur correction apparatus according to claim 11,
wherein the determining device takes a fact that the blur signal is continuously in a saturated state for a predetermined determining time or more as a determining condition for determining that a pan/tilt operation is being performed.

* * * * *